United States Patent
Elsberg et al.

(10) Patent No.: US 8,314,791 B2
(45) Date of Patent: Nov. 20, 2012

(54) METHOD AND APPARATUS FOR DETERMINING VIEW IMPACT

(75) Inventors: Nathan Elsberg, Modiin (IL); Alex Hazanov, Katzir (IL); Simon Kahn, Jerusalem (IL)

(73) Assignee: RDV Systems Ltd., Rosh Ha'ayin (IL)

(*) Notice: Subject to any disclaimer, the term of this patent is extended or adjusted under 35 U.S.C. 154(b) by 1036 days.

(21) Appl. No.: 12/273,561

(22) Filed: Nov. 19, 2008

(65) Prior Publication Data

US 2009/0128554 A1    May 21, 2009

Related U.S. Application Data

(60) Provisional application No. 60/988,862, filed on Nov. 19, 2007.

(51) Int. Cl.
*G06T 17/00* (2006.01)
*G06T 15/40* (2006.01)
*G06K 9/68* (2006.01)
*G06F 17/50* (2006.01)

(52) U.S. Cl. ............. 345/420; 382/221; 345/421; 703/1
(58) Field of Classification Search ...... 703/1; 345/420, 345/421; 382/221
See application file for complete search history.

(56) References Cited

U.S. PATENT DOCUMENTS

| | | | |
|---|---|---|---|
| 5,832,106 A | 11/1998 | Kim | |
| 5,905,657 A | 5/1999 | Celniker | |
| 6,084,979 A | 7/2000 | Kanade et al. | |
| 6,128,577 A | 10/2000 | Assa et al. | |
| 6,313,837 B1 | 11/2001 | Assa et al. | |
| 6,421,116 B1 | 7/2002 | Schilli et al. | |
| 6,437,823 B1 | 8/2002 | Zhang | |
| 6,692,357 B2 | 2/2004 | Koizumi et al. | |
| 6,700,573 B2 | 3/2004 | Freeman | |
| 6,816,187 B1 | 11/2004 | Iwai et al. | |
| 6,850,875 B1* | 2/2005 | Claffey et al. | 703/6 |
| 6,910,001 B2 | 6/2005 | Hammersley et al. | |
| 6,930,715 B1 | 8/2005 | Mower | |
| 7,978,192 B2 | 7/2011 | Elsberg | |
| 8,031,210 B2 | 10/2011 | Elsberg | |
| 2002/0093538 A1 | 7/2002 | Carlin | |

(Continued)

OTHER PUBLICATIONS

Grazziotin, Pablo C., Benamy Turkienicz, Luciano Sclovsky, Carla M.D.S. Freitas. "Cityzoom—A Tool for the Visualization of the Impact of Urban Regulations". Investigacoes Cientificas. SiGraDi Unisinos 2004. p. 216-220.*

(Continued)

*Primary Examiner* — Aaron M Richer
(74) *Attorney, Agent, or Firm* — Simon Kahn

(57) ABSTRACT

A computer implemented method of determining a view impact of a target structure, the method constituted of: loading a 3D scene; determining a view point and direction of interest of the loaded 3D scene; rendering, without the target structure, a plane of the loaded 3D scene image perpendicular to the determined view point and direction of interest at a distance from the view point distal of the target structure; counting the number of pixels for the rendered plane without the target structure; rendering, with the target structure, a plane of the loaded 3D scene image perpendicular to the determined view point and direction of interest at the distance from the view point distal of the target structure; counting the number of pixels for the rendered plane with the target structure; and calculating the difference between the counted pixels with the target structure and the counted pixels without the target structure.

20 Claims, 4 Drawing Sheets

U.S. PATENT DOCUMENTS

| | | |
|---|---|---|
| 2002/0144278 A1 | 10/2002 | Pratts et al. |
| 2003/0012409 A1 | 1/2003 | Overton et al. |
| 2003/0103049 A1 | 6/2003 | Kindratenko et al. |
| 2004/0105573 A1 | 6/2004 | Neumann et al. |
| 2005/0091016 A1 | 4/2005 | Godavarthy et al. |
| 2007/0016372 A1 | 1/2007 | Browne et al. |
| 2007/0078636 A1 | 4/2007 | Elsberg et al. |
| 2008/0012863 A1 | 1/2008 | Finn et al. |
| 2008/0027684 A1 | 1/2008 | Inzinga et al. |
| 2008/0229234 A1 | 9/2008 | Astolfi et al. |
| 2008/0297505 A1 | 12/2008 | Elsberg |

OTHER PUBLICATIONS

Allen, Peter K., Michael K. Reed, Ioannis Stamos. "View Planning for Site Modeling". 1998.*

PD5D Smart Pack Manual (Published on the Internet Sep. 2003).

* cited by examiner

METHOD AND APPARATUS FOR DETERMINING VIEW IMPACT

CROSS-REFERENCE TO RELATED APPLICATION

This application claims priority to U.S. Provisional Patent Application Ser. No. 60/988,862 filed Nov. 19, 2007, the entire contents of which is incorporated herein by reference.

BACKGROUND OF THE INVENTION

The invention relates generally to the field of land use analysis, and in particular to a system and method of determining view obstruction and/or clarity.

The use of interactive and dynamic 3D computer graphics is becoming prevalent in the computing world. Typically, 3D visualization applications provide photo-realistic results using techniques such as ray tracing, radiosity, global illumination and other shading, shadowing and light reflection techniques. Such 3D visualization applications provide a 3D generated model, without relationship to the existing environment.

U.S. patent application Ser. No. 11/538,103 to Elsberg et al, entitled "Method and Apparatus for Virtual Reality Presentation of Civil Engineering, Land Planning and Infrastructure", published as US 2007/0078636 A1, the entire contents of which are incorporated herein by reference, is addressed to a computer implemented method of visualizing an infrastructure. Such a method allows for evaluating large scale designs in a virtual reality environment.

In the real world, any new development, or improvement, impacts surrounding buildings. For example, a new building for which a height variance is requested, will obstruct the existing view from existing buildings. The obstruction may have negative impacts, or positive impacts, depending on the existing view being obstructed, however a means for evaluating such an impact would be a useful tool in evaluating zoning change, or variance, requests. Similarly, land use requests for infrastructure impacts the view of pre-existing structures. Unfortunately, there is no way to automatically and consistently numerically quantify the impact of planned construction on the view of existing construction.

Google Earth, available from Google Inc. of Mountain View, Calif.; GIS Software products from ESRI of Redlands, Calif.; Autodesk DWF and U-VIS 360 available from Autodesk Inc., of San Rafael, Calif.; and Adobe 3D PDF, available from Adobe Systems, Inc., of San Jose, Calif., are all examples of currently available 3D GIS interactive viewers. The above mentioned limitation is not resolved by any of the above mentioned available viewers.

Additionally, when planning a new community, the ability to predict view factors of important valued scenery, would assist the developer in maximizing the value of the property. For example, when developing a lakefront property with a plurality of dwellings and infrastructure, a key factor in the value of each dwelling is the valued scenery, e.g. the lakefront view. A need therefore exists to automatically determine the amount of lakefront view available for each planned dwelling.

SUMMARY OF THE INVENTION

Accordingly, it is a principal object of the present invention to overcome at least some of the disadvantages of prior art. This is accomplished in certain embodiments by providing a computer implemented method of determining a view impact by: loading a 3D scene image comprising the subject view; rendering the 3D scene image without a target structure; optionally identifying, in cooperation with a user input, relevant areas of the subject view; adding the target structure to the 3D scene image; and determining the view impact of the added proposed structure to the subject view.

In one embodiment the relevant areas are further associated with values, preferably the values for each of the relevant areas may be positive or negative. The values preferably are reflective of valued scenery of the relevant areas. In another embodiment, the method further comprises rendering the 3D scene image with the added proposed structure.

In one embodiment, the method further comprises outputting a score of the view impact, preferably for each of a plurality of predetermined camera locations.

In one embodiment, the 3D scene image is representative of an existing development. In another embodiment, the 3D scene image is representative of a planned development.

In one embodiment, a computing platform operative to determine a view impact of a target structure is provided. The computing platform comprises a computer and a memory, and the computer is operative to load a 3D scene from the memory; determine a view point and direction of interest of the loaded 3D scene; render, without the target structure, a plane of the loaded 3D scene image perpendicular to the determined view point and direction of interest at a distance from the view point distal of the target structure; count the pixels for the rendered plane without the target structure; render, with the target structure, a plane of the loaded 3D scene image perpendicular to the determined view point and direction of interest at the distance from the view point distal of the target structure; count the pixels for the rendered plane with the target structure; and calculate the difference between the counted pixels with the target structure and the counted pixels without the target structure.

In one embodiment a computer-readable medium containing instructions for controlling a data processing system to perform a computer implemented method of determining a view impact of a target structure is provided. The computer implemented method comprises: loading a 3D scene; determining a view point and direction of interest of the loaded 3D scene; rendering, without the target structure, a plane of the loaded 3D scene image perpendicular to the determined view point and direction of interest at a distance from the view point distal of the target structure; counting the number of pixels for the rendered plane without the target structure; rendering, with the target structure, a plane of the loaded 3D scene image perpendicular to the determined view point and direction of interest at the distance from the view point distal of the target structure; counting the number of pixels for the rendered plane with the target structure; and calculating the difference between the counted pixels with the target structure and the counted pixels without the target structure.

In one embodiment, a computer implemented method of determining a view impact of a target architectural, engineer or construction project, is provided. The computer implemented method comprises: loading a pre-project 3D scene; determining at least one view point and direction of interest of the loaded pre-project 3D scene; identifying objects of interest and associated values for the loaded pre-project 3D scene; counting, for each of the at least one view point and direction, the number of pixels for the each of the identified objects of interest of the loaded pre-project 3D scene; loading a post-project 3D scene; identifying objects of interest and associated values for the loaded post-project 3D scene; counting, for each of the at least one view point and direction, the number of pixels for the each of the identified objects of interest of the loaded post-project 3D scene; and calculating a weighted difference between the counted pixels of the objects of interest of the loaded post-project 3D scene and the counted pixels of the objects of interest of the pre-project 3D scene, the weighting responsive to the associated values of the objects of interest.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

Figure 1:
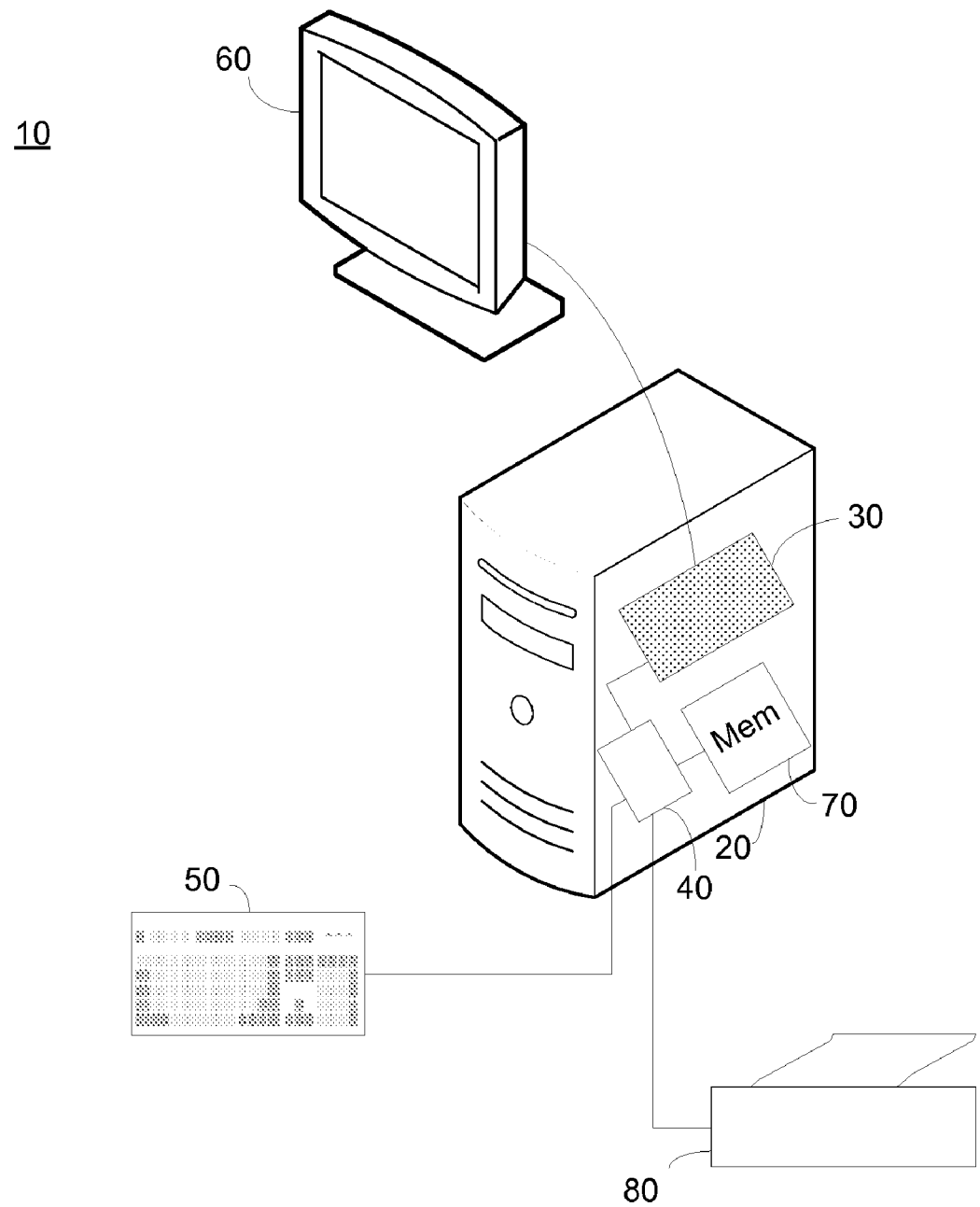
FIG. 1 illustrates a high level block diagram of a computing platform.

Certain of the present embodiments enable a computer implemented method of determining a view impact. In one particular embodiment, the computer implemented method comprisees: loading a 3D scene image comprising the subject view; rendering the 3D scene image without a target structure; optionally identifying, in cooperation with a user input, relevant areas of the subject view; adding the target structure to the 3D scene image; and determining the view impact of the added proposed structure to the subject view.

For consistency, and ease of understanding, the term target structure, is used throughout this document to identify the new development or improvement whose view impact is to be evaluated. The term target structure is not meant to be limiting in any way, and specifically includes the entire range of architectural, engineering or construction projects. The term environment is used throughout this document to identify the remaining structures on which the impact of the target structure is to be evaluated. It is to be understood that the environment may be planned and not yet constructed, or may comprise existing structures and environmental conditions without exceeding the scope of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 illustrates a high level block diagram of a computing platform 10 comprising: a computing device 20 comprising a graphics card 50, a processor 40 and a memory 70; a user input device 50; a monitor 60; and an output device 80, such as a printer. Monitor 60 is connected to the output of graphics card 50 and computing device 20 is connected to user input device 50. Processor 40 is in communication with graphics card 50, memory 70, user input 50 and output device 80.

User input device 50 is illustrated as a keyboard, however this is not meant to be limiting in any way. The use of any or all of a pointing device, a voice input, or a touch screen is equally applicable and is specifically included. Memory 70 is illustrated as being internal to computing device 20, however this is not meant to be limiting in any way. Memory 70 may be provided external to computing device 20, such as a network server, the Internet, or a removable computer readable media, without exceeding the scope of the invention. Memory 70 comprises a 3D scene of an environment for which the view impact of a target structure is to be determined, and a 3D model of the target structure. The 3D scene of the environment may comprise the target structure without exceeding the scope of the invention. Memory 70 of computing device 20 is further operative to store the method according to the principle of the invention in computer readable format for execution by computing device 20.

In one embodiment the 3D scene is developed in accordance with the teachings of U.S. patent application Ser. No. 11/538,103 to Elsberg et al, entitled "Method and Apparatus for Virtual Reality Presentation of Civil Engineering, Land Planning and Infrastructure", published as US 2007/0078636 A1, incorporated above by reference. In another embodiment the 3D scene of the environment is developed via photogrammetry, from existing architectural plans, via light detecting and ranging (LIDAR) and/or from existing or developed geographic information system (GIS) data. The 3D scene of the environment may be provided by any of Google Earth, GIS Software products from ESRI, Autodesk DWF and U-VIS 360, Adobe 3D PDF and any other available 3D virtual city modeling analysis tools.

In operation, in one embodiment computing device 20 loads the environment 3D scene from memory 70, and renders the 3D scene on monitor 60 via graphics card 50. In one embodiment, a user then determines one or more view points and directions of interest in the 3D scene, and inputs the determination via user input device 50. Each view point and direction functions as a camera point for determining the view impact of the target structure, as will be explained further below. In one embodiment, a range of directions is specified for one or more view points, with camera angle steps, and computing device 20 automatically determines the directions for the one or more view points responsive to the range of directions and camera angle steps. In another embodiment, a range of view points is specified along a coordinate, with distance steps, and computing device 20 automatically determines the camera points responsive to the range of view points and distance steps. In yet another embodiment, a user data file is input comprising view points and directions of interest. In yet another embodiment, at least one direction and/or view point is automatically calculated by computing device 20 in response to a selection of valued scenery, which will be described further hereinto below. In the event that the target structure is part of the loaded environment, a user further identifies via user input device 50 the target structure.

Processor 40, responsive to the one or more selected view points and directions, creates for each of the selected view points and directions a plane perpendicular to the respective determined view point and direction. The planes are each created at a distance from the respective selected view point so as to be behind the target structure when viewed from the selected view point, i.e. distal of the target structure. Processor 40 further renders the created plane without the target structure, preferably via one of OpenGL or DirectX, preferably placing appropriate pixels in a pixel buffer on graphics card 30, for display on monitor 60. OpenGL is a standard for graphics programming available from the OpenGL Architecture Review Board, care of the Kronos Group, Chillicothe, Ohio. DirectX is available from Microsoft Corporation, Redmond, Wash.

In the event that the target structure is part of the loaded environment, and has thus been identified as described above, the created plane is rendered with the target structure off. In one embodiment at least one pixel is formed from picture element fragments. Any view blocking structures in the determined direction between the determined view point and the created plane will exhibit a depth value greater than that of the created plane and will thus result in no pixel information for pixels affected by the blocking structure location. Processor 40 then counts the pixels of the created plane without the target structure.

Processor 40 further renders the created plane with the loaded target structure, preferably via one of OpenGL or DirectX, preferably placing appropriate pixels in a pixel buffer on graphics card 50, for display on monitor 60. In the event that the target structure is part of the loaded environment, and has thus been identified as described above, the created plane is rendered with the target structure on. In one embodiment at least one pixel is formed from picture element fragments. Any view blocking structures in the determined direction between the determined view point and the created plane, including those of the target structure, will exhibit a depth value greater than that of the created plane and will thus result in no pixel information for pixels affected by the blocking structure location. Processor 40 then counts the pixels of the created plane with the target structure.

Processor 40 then calculates a difference between the counted pixels of the rendered planes with the target structure and without the target structure. In the event that a plurality of selected view points and directions has been determined, the difference is calculated for each of the selected view points and directions. The differences, and the sum of the differences, are output on monitor 60 and/or on output device 80.

In another embodiment, computing device 20 loads the environment 3D scene from memory 70, and renders the 3D scene on monitor 60 via graphics card 50. In one embodiment, a user then determines one or more view points and directions of interest in the 3D scene, and inputs the determination via user input device 50. Each view point and direction functions as a camera point for determining the view impact of the target structure, as will be explained further below. In the event that the target structure is part of the loaded environment, a user further identifies via user input device 50 the target structure. A user then further determines and identifies, via user input device 50, one ore more objects of interest, and associated values for each object of interest. In an exemplary embodiment, objects of interest represent positive value view features such as, without limitation, a body of water, a canyon, mountain range or forest and/or negative view value features such as a garbage dump, strip mall or car wash.

Processor 40, responsive to the one or more selected view points and directions, renders the environment 3D scene without the target structure, preferably via one of OpenGL or DirectX, preferably placing appropriate pixels in a pixel buffer on graphics card 50, for display on monitor 60. In the event that the target structure is part of the loaded environment, and has thus been identified as described above, the environment 3D scene is rendered with the target structure off. In one embodiment at least one pixel is formed from picture element fragments. Processor 40 then counts the pixels of the scene rendered without the target structure associated with each of the determined objects of interest.

Processor 40 further renders responsive to the one or more selected view points and directions, the environment 3D scene with the target structure, preferably via one of OpenGL or DirectX, preferably placing appropriate pixels in a pixel buffer on graphics card 50, for display on monitor 60. In the event that the target structure is part of the loaded environment, and has thus been identified as described above, the environment 3D scene is rendered with the target structure on. In one embodiment at least one pixel is formed from picture element fragments. Processor 40 then counts the pixels of the scene rendered with the target structure associated with each of the determined objects of interest.

Processor 40 then calculates a weighted difference between the counted pixels of the environment 3D scene with the target structure and the counted pixels of the environment 3D scene without the target structure. Preferably the weighting is responsive to the values assigned by the user to each of the objects of interest. In the event that a plurality of selected view points and directions has been determined, the difference is calculated for each of the selected view points and directions. The differences, and the sum of the differences, are output on monitor 60 and/or on output device 80.

In another embodiment, computing device 20 loads an environment 3D scene is loaded comprising a pre-change view, e.g. a 3D scene of the subject landscape prior to the proposed, or accomplished, changes, from memory 70. Optionally, the loaded 3D scene is rendered, preferably via one of OpenGL or DirectX, on monitor 60. One or more view points and directions of interest in the 3D scene are determined, optionally via a user input device 50. Each view point and direction functions as a camera point for determining the view impact of the target structure, as will be explained further below. In one embodiment, a range of directions is specified for one or more view points, with camera angle steps, and processor 40 automatically determines the directions for the one or more view points responsive to the range of directions and camera angle steps. In another embodiment, a range of view points is specified along a coordinate, with distance steps, and processor 40 automatically determines the camera points responsive to the range of view points and distance steps. In yet another embodiment, a user data file is input via memory 70 comprising view points and directions of interest. In yet another embodiment, at least one direction and/or view point is automatically calculated by processor 40 in response to a selection of valued scenery, which will be described further hereinto below.

One or more objects of interest of the pre-change 3D scene are identified, optionally, via user input device 50. In another embodiment, a user data file is input comprising the objects of interest. For each identified object of interest, an associated value is input, optionally via user implementing user input device 50. In another embodiment a user data file is input. In an exemplary embodiment, objects of interest represent positive value view features such as, without limitation, a body of water, a canyon, mountain range or forest and/or negative view value features such as a garbage dump, strip mall or car wash.

Processor 40 is operative to render the pre-change 3D scene at each of the view points and directions, preferably via one of OpenGL or DirectX preferably placing appropriate pixels in a pixel buffer on graphics card 30. Pixels associated with each one of the objects of interest are counted by processor 40. The pixels associated with each of the objects of interest are summed separately. Optionally, at least one pixel is formed from picture element fragments. Optionally, the rendered pixels are placed in a pixel buffer, and counted therein.

Processor 40 is further operative to load the environment 3D scene comprising the post change view, e.g. a 3D scene of the subject landscape after the proposed, or accomplished, changes and render the scene at each of the view points and directions, preferably via one of OpenGL or DirectX. One or more objects of interest of the post-change 3D scene are identified. Preferably, the objects of interest identified of the pre-change scene are highlighted, indicating that they have been pre-identified. Optionally, the identifying is responsive to a user input implementing user input device 50. In another embodiment, a user data file is input comprising the objects of interest for the post change scene, and for each identified object of interest an associated value is input, optionally via user implementing user input device 50. In another embodiment a user data file is input. Preferably, highlighted objects of interest identified for the pre-change scene, for which values were input, are identified with the input values. Optionally, a single user data file comprising the objects of interest and values is supplied. In an exemplary embodiment, objects of interest represent positive value view features such as, without limitation, a body of water, a canyon, mountain range or forest and/or negative view value features such as a garbage dump, quarry or strip mine.

Computing platform 10 renders the environment post-change 3D scene, for each view point and direction, preferably via one of OpenGL or DirectX preferably placing appropriate pixels in a pixel buffer on graphics card 30. Pixels for each object of interest are counted, for each view point and direction. The pixels associated with each of the objects of interest are summed separately. Optionally, at least one pixel is formed from picture element fragments. Preferably, the rendered pixels are placed in a pixel buffer, and counted therein.

Processor 40 calculates a weighted difference between the counted pixels of the pre-change 3D scene and the counted pixels of the post-change 3D scene for each of the determined view points and directions. Preferably the weighting is responsive to the input values. The differences, and the sum of the differences, are output, preferably on monitor 60 and/or on output device 80, for determination of the view impact.

Figure 2:
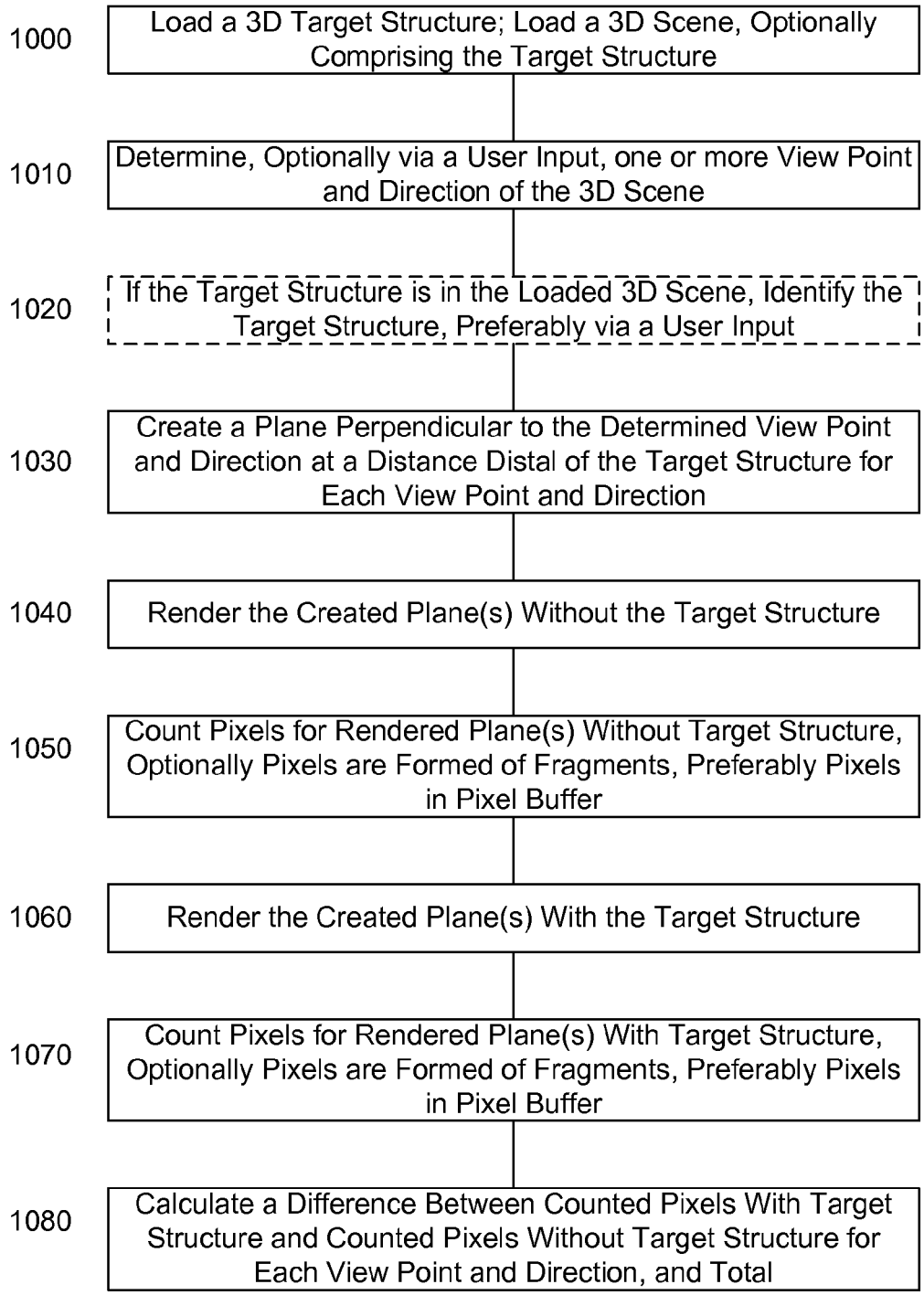
FIG. 2 illustrates a high level flow chart of an embodiment of a method of determining an overall view impact.

FIG. 2 illustrates a high level flow chart of an embodiment of a method of determining an overall view impact operative in cooperation with computing platform 10 of FIG. 1. In stage 1000, an environment 3D scene is loaded and a 3D target structure is loaded. Optionally, the loaded environment 3D scene comprises the target structure. In stage 1010, one or more view points and directions of interest in the 3D scene are determined, optionally via a user input responsive to a rendering on monitor 60. Each view point and direction functions as a camera point for determining the view impact of the target structure, as will be explained further below. In one embodiment, a range of directions is specified for one or more view points, with camera angle steps, and the computer implemented method automatically determines the directions for the one or more view points responsive to the range of directions and camera angle steps. In another embodiment, a range of view points is specified along a coordinate, with distance steps, and the computer implemented method automatically determines the camera points responsive to the range of view points and distance steps. In yet another embodiment, a user data file is input comprising view points and directions of interest. In yet another embodiment, at least one direction and/or view point is automatically calculated by the computer implemented method in response to a selection of valued scenery, which will be described further hereinto below.

In optional stage 1020, in the event that in stage 1000 the environment 3D scene comprises the target structure, the target structure is identified optionally via a user input. In stage 1030, responsive to the one or more selected view points and directions of stage 1010, a plane perpendicular to the respective determined view point and direction is created for each of the selected view points and directions. The planes are each created at a distance from the respective selected view point so as to be behind the 3D target structure when viewed from the selected view point, i.e. distal of the target structure. In stage 1040, each of the created planes is rendered without the target structure, preferably via one of OpenGL or DirectX, preferably placing appropriate pixels in a pixel buffer on a graphics card. In the event that the target structure is part of the loaded environment, and has thus been identified as described above in optional stage 1020, the created plane is rendered with the target structure off. Any view blocking structures in the determined direction between the determined view point and the created plane will exhibit a depth value greater than that of the created plane and will thus result in no pixel information in the rendering for pixels affected by the blocking structure location. In stage 1050, the pixels for the rendered created plane without the target structure are counted. Optionally, at least one pixel is formed from picture element fragments. Preferably, the rendered pixels are placed in a pixel buffer, and counted therein.

In stage 1060, each of the created planes is rendered with the target structure, preferably via one of OpenGL or DirectX, preferably placing appropriate pixels in a pixel buffer on a graphics card. In the event that the target structure is part of the loaded environment, and has thus been identified as described above in optional stage 1020, the created plane is rendered with the target structure on. Any view blocking structures in the determined direction between the determined view point and the created plane, including the target structure, will exhibit a depth value greater than that of the created plane and will thus result in no pixel information in the rendering for pixels affected by the blocking structure location. In stage 1070, the pixels for the rendered created plane with the target structure are counted. Optionally, at least one pixel is formed from picture element fragments. Preferably, the rendered pixels are placed in a pixel buffer, and counted therein.

In stage 1080, the difference between the counted pixels of the rendered planes with the target structure and the counted pixels of the rendered planes without the target structure is calculated. In the event that a plurality of selected view points and directions has been determined, the difference is calculated for each of the selected view points and directions. The differences, and the sum of the differences, are output, preferably on monitor 60 and/or on output device 80, for determination of the view impact.

Figure 3:
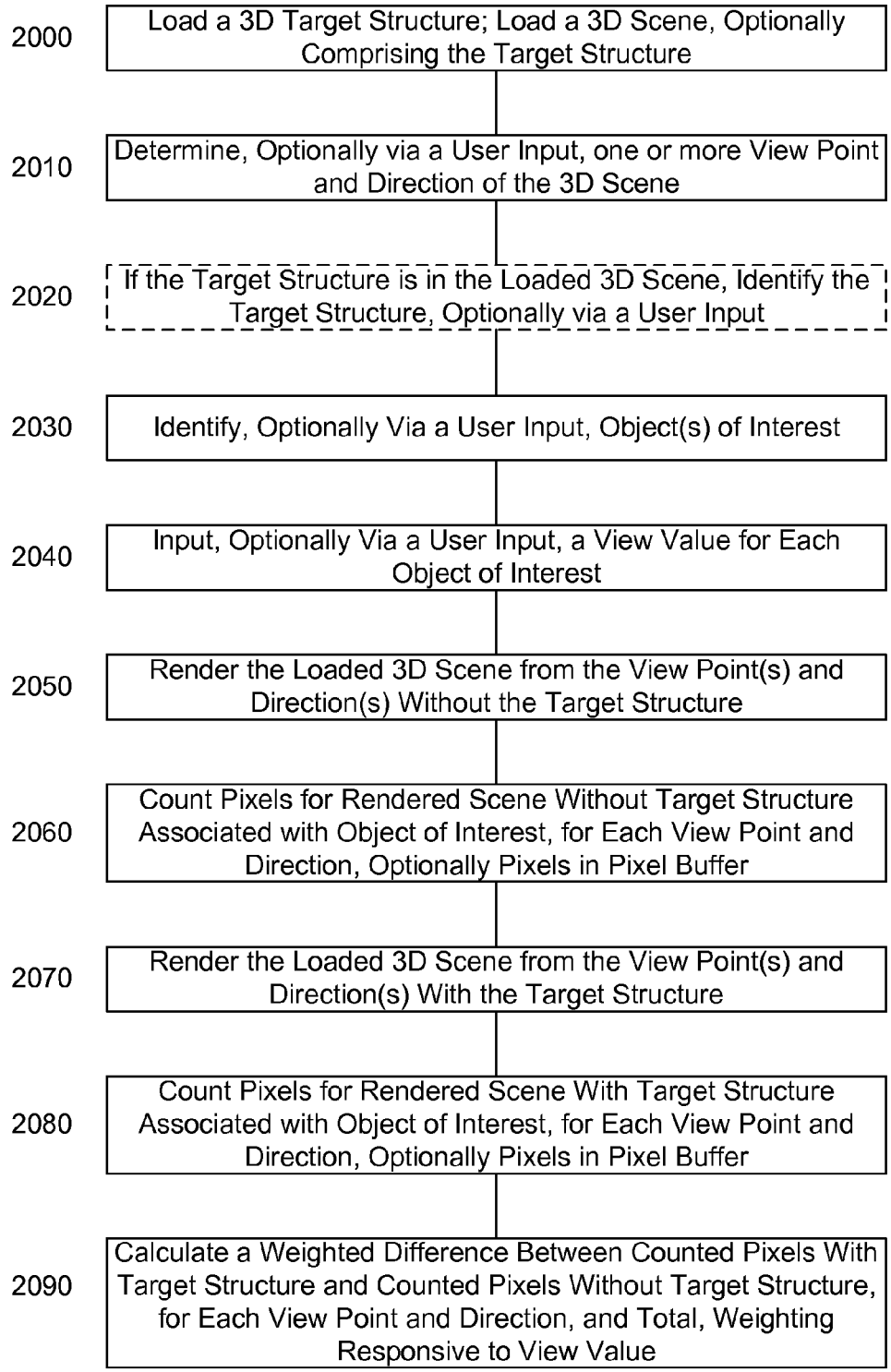
FIG. 3 illustrates a high level flow chart of an embodiment of a method of determining a value based view impact.

FIG. 3 illustrates a high level flow chart of an embodiment of a method of determining a value based view impact operative in cooperation with computing platform 10 of FIG. 1. The method of FIG. 3 may be used in addition to the method of FIG. 2, or in place of the method of FIG. 2 without exceeding the scope of the invention.

In stage 2000, an environment 3D scene is loaded and a 3D target structure is loaded. Optionally, the loaded environment 3D scene comprises the target structure. In stage 2010, one or more view points and directions of interest in the 3D scene are determined, preferably via a user input responsive to a rendering on monitor 60. Each view point and direction functions as a camera point for determining the view impact of the target structure, as will be explained further below. In one embodiment, a range of directions is specified for one or more view points, with camera angle steps, and the computer implemented method automatically determines the directions for the one or more view points responsive to the range of directions and camera angle steps. In another embodiment, a range of view points is specified along a coordinate, with distance steps, and the computer implemented method automatically determines the camera points responsive to the range of view points and distance steps. In yet another embodiment, a user data file is input comprising view points and directions of interest. In yet another embodiment, at least one direction and/or view point is automatically calculated by the computer implemented method in response to a selection of valued scenery, which will be described further hereinto below.

In optional stage 2020, in the event that in stage 2000 the environment 3D scene comprises the target structure, the target structure is identified optionally via a user input. In stage 2030, one or more objects of interest are identified, optionally via user implementing user input device 50. In stage 2040, for each identified object of interest of stage 2030, and associated value is input, optionally via user implementing user input device 50. In an exemplary embodiment, objects of interest represent positive value view features such as, without limitation, a body of water, a canyon, mountain range or forest and/or negative view value features such as a garbage dump, strip mall or car wash.

In stage 2050, the environment 3D scene is rendered at each of the view points and directions of stage 2010 without the target structure, preferably via one of OpenGL or DirectX preferably placing appropriate pixels in a pixel buffer on a graphics card. In the event that the target structure is part of the loaded environment, and has thus been identified as described above in optional stage 2020, the created plane is rendered with the target structure off. In stage 2060, pixels for each of the environment 3D scene rendered without the target structure, associated with one of the objects of interest of stage 2030, are counted. The pixels associated with each of the objects of interest are summed separately. Optionally, at least one pixel is formed from picture element fragments. Preferably, the rendered pixels are placed in a pixel buffer, and counted therein.

In stage 2070, the environment 3D scene is rendered at each of the view points and directions of stage 2010 with the target structure, preferably via one of OpenGL or DirectX preferably placing appropriate pixels in a pixel buffer on a graphics card. In the event that the target structure is part of the loaded environment, and has thus been identified as described above in optional stage 2020, the created plane is rendered with the target structure on. In stage 2080, pixels for each of the environment 3D scene rendered with the target structure, associated with one of the objects of interest of stage 2030, are counted. The pixels associated with each of the objects of interest are summed separately. Optionally, at least one pixel is formed from picture element fragments. Preferably, the rendered pixels are placed in a pixel buffer, and counted therein.

In stage 2090, a weighted difference is calculated between the counted pixels of the environment 3D scene with the target structure and the counted pixels of the environment 3D scene without the target structure for each of the determined view points and directions. Preferably the weighting is responsive to the values of stage 2040. The differences, and the sum of the differences, are output, preferably on monitor 60 and/or on output device 80, for determination of the view impact.

Figure 4:
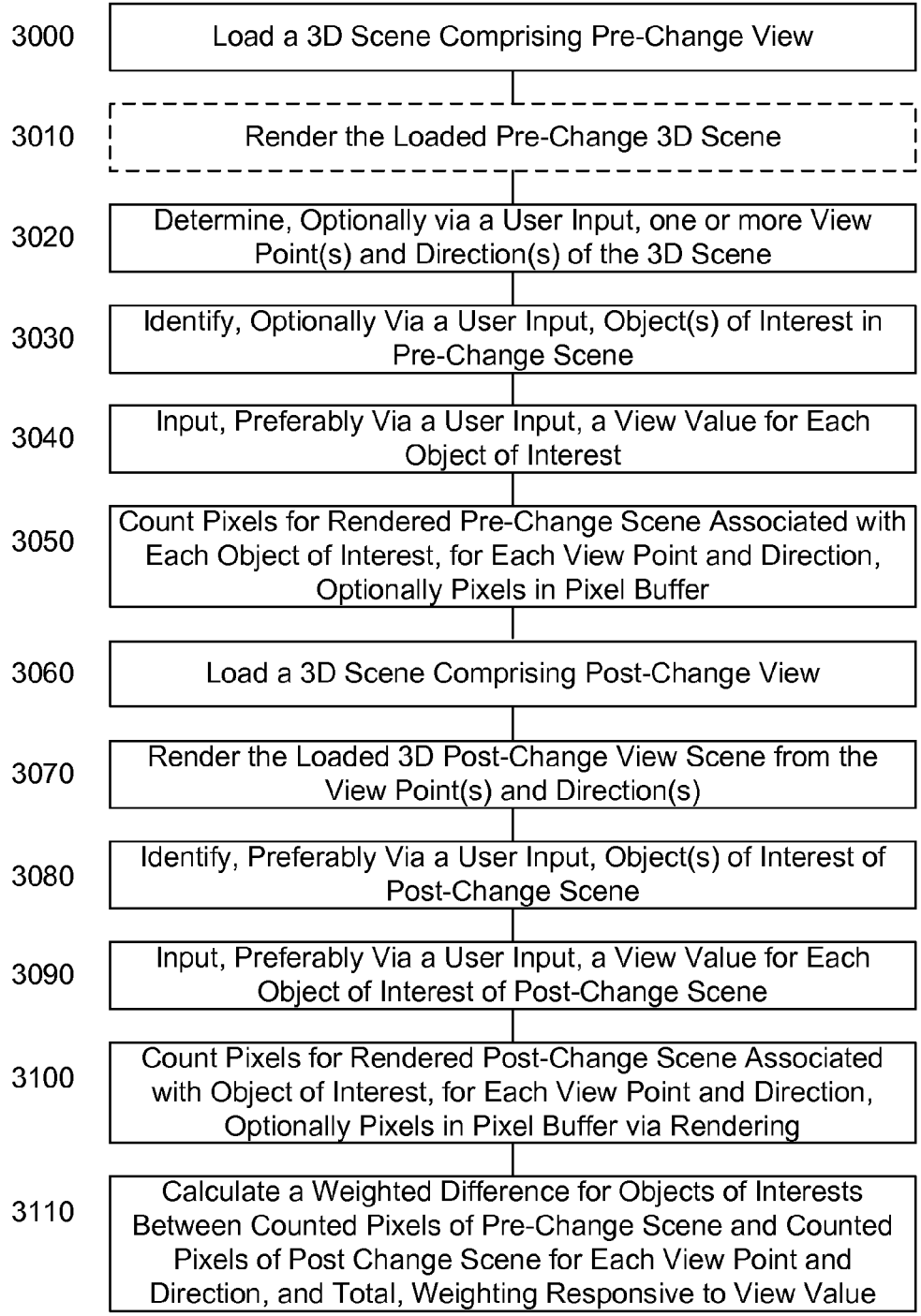
FIG. 4 illustrates a high level flow chart of an embodiment of a method of determining a value based view impact for a changed landscape.

FIG. 4 illustrates a high level flow chart of an embodiment of a method of determining a value based view impact for a changed landscape. The method of FIG. 4 may be used in addition to the method of FIG. 3, or in place of the method of FIG. 3 without exceeding the scope of the invention.

In stage 3000, an environment 3D scene is loaded comprising a pre-change view, e.g. a 3D scene of the subject landscape prior to the proposed, or accomplished, changes. In optional stage 3010, the loaded 3D scene is rendered, preferably via one of OpenGL or DirectX, to assist an optional user input of stage 3020, as will be described further hereinto below.

In stage 3020, one or more view points and directions of interest in the 3D scene are determined, optionally via a user input responsive to the optional rendering of stage 3010. Each view point and direction functions as a camera point for determining the view impact of the target structure, as will be explained further below. In one embodiment, a range of directions is specified for one or more view points, with camera angle steps, and the computer implemented method automatically determines the directions for the one or more view points responsive to the range of directions and camera angle steps. In another embodiment, a range of view points is specified along a coordinate, with distance steps, and the computer implemented method automatically determines the camera points responsive to the range of view points and distance steps. In yet another embodiment, a user data file is input comprising view points and directions of interest. In yet another embodiment, at least one direction and/or view point is automatically calculated by the computer implemented method in response to a selection of valued scenery, which will be described further hereinto below.

In stage 3030, one or more objects of interest of the pre-change 3D scene are identified. Optionally, the identifying is responsive to a user input implementing user input device 50 and the optional rendering of stage 3100. In another embodiment, a user data file is input comprising the objects of interest. In stage 3040, for each identified object of interest of stage 3030, and associated value is input, optionally via user implementing user input device 50. In another embodiment a user data file is input. Optionally, a single user data file comprising the information of stage 3030 and stage 3040 is supplied. In an exemplary embodiment, objects of interest represent positive value view features such as, without limitation, a body of water, a canyon, mountain range or forest and/or negative view value features such as a garbage dump, strip mall or car wash.

In stage 3050, the pre-change 3D scene is rendered at each of the view points and directions of stage 3020, preferably via one of OpenGL or DirectX preferably placing appropriate pixels in a pixel buffer on a graphics card. Pixels associated with each one of the objects of interest of stage 3030, are counted. The pixels associated with each of the objects of interest are summed separately. Optionally, at least one pixel is formed from picture element fragments. Optionally, the rendered pixels are placed in a pixel buffer, and counted therein.

In stage 3060, the environment 3D scene of stage 3000 is loaded comprising the post change view, e.g. a 3D scene of the subject landscape after the proposed, or accomplished, changes. In stage 3070, the environment 3D scene of stage 3060 is rendered at each of the view points and directions of stage 3020, preferably via one of OpenGL or DirectX.

In stage 3080, one or more objects of interest of the post-change 3D scene are identified. Preferably, the objects of interest identified in stage 3030 are highlighted, indicating that they have been pre-identified. Optionally, the identifying is responsive to a user input implementing user input device 50 and the optional rendering of stage 3070. In another embodiment, a user data file is input comprising the objects of interest for the post change scene of stage 3060. In stage 3090, for each identified object of interest of stage 3080, and associated value is input, optionally via user implementing user input device 50. In another embodiment a user data file is input. Preferably, highlighted objects of interest identified in stage 3030, for which values were input in stage 3040, are identified with the input values. Optionally, a single user data file comprising the information of stage 3080 and stage 3090 is supplied. In an exemplary embodiment, objects of interest represent positive value view features such as, without limitation, a body of water, a canyon, mountain range or forest and/or negative view value features such as a garbage dump, quarry or strip mine.

In stage 3100, the environment 3D scene of stage 3060 is rendered, for each view point and direction, preferably via one of OpenGL or DirectX preferably placing appropriate pixels in a pixel buffer on a graphics card. Pixels for each object of interest of stage 3080 are counted, for each view point and direction. The pixels associated with each of the objects of interest are summed separately. Optionally, at least one pixel is formed from picture element fragments. Preferably, the rendered pixels are placed in a pixel buffer, and counted therein.

In stage 3110, a weighted difference is calculated between the counted pixels of the pre-change 3D scene of stage 3050 and the counted pixels of the post-change 3D scene of stage 3100 for each of the determined view points and directions. Preferably the weighting is responsive to the values of stages 3040, 3090. The differences, and the sum of the differences, are output, preferably on monitor 60 and/or on output device 80, for determination of the view impact.

Thus certain of the present embodiments enable a computer implemented method of determining a view impact. This is accomplished in particular embodiments by: loading a 3D scene image comprising the subject view; rendering the 3D scene image without a target structure; optionally identifying, in cooperation with a user input, relevant areas of the subject view; adding the target structure to the 3D scene image; and determining the view impact of the added proposed structure to the subject view.

The above has been described in relation to a single target object, however this is not meant to be limiting in any way. In one embodiment, a plurality of potential target objects may be similarly evaluated, thus determining the lowest view impact potential target object. Thus, a plurality of scenarios may be easily evaluated in accordance with the teaching of the invention.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

We claim:

1. A computer implemented method of determining a view impact of a target structure, the method comprising:
   loading a 3D scene;
   determining a view point and direction of interest of said loaded 3D scene;
   rendering, without the target structure, a plane of said loaded 3D scene image perpendicular to said determined view point and direction of interest at a distance from said view point distal of the target structure;
   counting the number of pixels for said rendered plane without the target structure;
   rendering, with the target structure, a plane of said loaded 3D scene image perpendicular to said determined view point and direction of interest at the distance from said view point distal of the target structure;
   counting the number of pixels for said rendered plane with the target structure; and
   calculating the difference between the counted pixels with the target structure and the counted pixels without the target structure.

2. A computer implemented method according to claim 1, wherein said loaded 3D scene comprises the target structure, the method further comprising:
   identifying the target structure,
   wherein said rendering of said plane without the target structure comprises rendering said plane with the identified target structure off, and
   wherein said rendering of said plane with the target structure comprises rendering said plane with the identified target structure on.

3. A computer implemented method according to claim 2, wherein said identifying the target structure is in cooperation with a user input.

4. A computer implemented method according to claim 1, wherein said counted pixels are in a pixel buffer.

5. A computer implemented method according to claim 1, further comprising:
   identifying at least one object of interest in the determined view point and direction of interest;
   inputting a value for each of said identified at least one object of interest;
   rendering, without the target structure, said loaded 3D scene image at said determined view point and direction;

counting, for said rendered 3D scene image without the target structure, the number of pixels associated with each of said at least one identified objects of interest;

rendering, with the target structure, said loaded 3D scene image at said determined view point and direction;

counting, for said rendered 3D scene image with the target structure, the number of pixels associated with each of said at least one identified objects of interest; and calculating a weighted difference between the counted pixels for said rendered 3D scene image with the target structure and the counted pixels for said rendered 3D scene image without the target structure, said weighting responsive to said inputted values.

6. A computer implemented method according to claim 5, wherein said identifying said at least one object of interest is in cooperation with a user input.

7. A computer implemented method according to claim 1, wherein at least one of the pixels is formed from fragments.

8. A computing platform operative to determine a view impact of a target structure the computing platform comprising a computer and a memory, the computer being operative to:

load a 3D scene from the memory;

determine a view point and direction of interest of said loaded 3D scene;

render, without the target structure, a plane of said loaded 3D scene image perpendicular to said determined view point and direction of interest at a distance from said view point distal of the target structure;

count the pixels for said rendered plane without the target structure;

render, with the target structure, a plane of said loaded 3D scene image perpendicular to said determined view point and direction of interest at the distance from said view point distal of the target structure;

count the pixels for said rendered plane with the target structure; and calculate the difference between the counted pixels with the target structure and the counted pixels without the target structure.

9. A computing platform according to claim 8, further comprising a user input device, wherein said determining a view point and direction of interest of said loaded 3D scene is responsive to the user input device.

10. A computing platform according to claim 8, wherein said loaded 3D scene comprises the target structure, the computing platform being further operative to:

identify the target structure, wherein said rendering of said plane without the target structure comprises render said plane with the identified target structure off, and wherein said rendering of said plane with the target structure comprises render said plane with the identified target structure on.

11. A computing platform according to claim 10, further comprising a user input device, wherein said identifying the target structure is responsive to the user input device.

12. A computing platform according to claim 8, wherein said computing platform is further operative to:

identify at least one object of interest in the determined view point and direction of interest;

input a value for each of said identified at least one object of interest;

render, without the target structure, said loaded 3D scene image at said determined view point and direction;

count, for said rendered 3D scene image without the target structure, the number of pixels associated with each of said at least one identified objects of interest;

render, with the target structure, said loaded 3D scene image at said determined view point and direction;

count, for said rendered 3D scene image with the target structure, the number of pixels associated with each of said at least one identified objects of interest; and calculate a weighted difference between the counted pixels for said rendered 3D scene image with the target structure and the counted pixels for said rendered 3D scene image without the target structure, said weighting responsive to said inputted values.

13. A computing platform according to claim 12, further comprising a user input device, said identifying said at least one object of interest in cooperation with said user input device.

14. A computing platform according to claim 8, wherein at least one of the pixels is formed from fragments.

15. A non-transitory computer-readable medium containing instructions for controlling a data processing system to perform a computer implemented method of determining a view impact of a target structure, the method comprising:

loading a 3D scene;

determining a view point and direction of interest of said loaded 3D scene;

rendering, without the target structure, a plane of said loaded 3D scene image perpendicular to said determined view point and direction of interest at a distance from said view point distal of the target structure;

counting the number of pixels for said rendered plane without the target structure;

rendering, with the target structure, a plane of said loaded 3D scene image perpendicular to said determined view point and direction of interest at the distance from said view point distal of the target structure;

counting the number of pixels for said rendered plane with the target structure; and calculating the difference between the counted pixels with the target structure and the counted pixels without the target structure.

16. A non-transitory computer-readable medium according to claim 15, wherein said loaded 3D scene comprises the target structure, the method further comprising:

identifying the target structure, wherein said rendering of said plane without the target structure comprises rendering said plane with the identified target structure off, and wherein said rendering of said plane with the target structure comprises rendering said plane with the identified target structure on.

17. A non-transitory computer-readable medium according to claim 16, wherein said identifying the target structure is in cooperation with a user input.

18. A non-transitory computer-readable medium according to claim 15, the method further comprising:

identifying at least one object of interest in the determined view point and direction of interest;

inputting a value for each of said identified at least one object of interest;

rendering, without the target structure, said loaded 3D scene image at said determined view point and direction;

counting, for said rendered 3D scene image without the target structure, the number of pixels associated with each of said at least one identified objects of interest;

rendering, with the target structure, said loaded 3D scene image at said determined view point and direction;

counting, for said rendered 3D scene image with the target structure, the number of pixels associated with each of said at least one identified objects of interest; and calculating a weighted difference between the counted pixels for said rendered 3D scene image with the target structure and the counted pixels for said rendered 3D scene image without the target structure, said weighting responsive to said inputted values.

19. A non-transitory computer-readable medium according to claim 18, wherein said identifying said at least one object of interest is in cooperation with a user input.

20. A non-transitory computer-readable medium according to claim 15, wherein at least one of the pixels is formed from fragments.

* * * * *